United States Patent [19]

Solomon et al.

[11] Patent Number: 5,705,786
[45] Date of Patent: Jan. 6, 1998

[54] UNDERWATER WELDING

[75] Inventors: Harvey Donald Solomon; Raymond Alan White, both of Schenectady; Robert Anthony Fusaro, Jr., Cobleskill, all of N.Y.

[73] Assignee: General Electric Company, Schenectady, N.Y.

[21] Appl. No.: 581,386

[22] Filed: Dec. 29, 1995

[51] Int. Cl.⁶ .................................................. B23K 10/00
[52] U.S. Cl. .............................. 219/121.46; 219/121.45; 219/121.43; 219/72
[58] Field of Search .................. 219/137.12, 117.1, 219/121.45, 121.46, 121.59, 121.51, 74, 75

[56] References Cited

U.S. PATENT DOCUMENTS

| | | | |
|---|---|---|---|
| 4,039,798 | 8/1977 | Lythall et al. | 219/72 |
| 4,172,974 | 10/1979 | Shtingelin et al. | 219/74 |
| 4,627,990 | 12/1986 | Saga et al. | 427/10 |
| 4,659,898 | 4/1987 | Spiegelman et al. | 219/117.1 |
| 4,745,256 | 5/1988 | Shubert | 219/77 |

Primary Examiner—Mark H. Paschall
Attorney, Agent, or Firm—James Magee, Jr.

[57] ABSTRACT

Persistent compressive stresses sufficient to suppress hot cracking, reheat cracking and stress corrosion cracking are developed in welds containing alloys of plural materials by quenching of the weld after onset of solidification but while the weld remains soft or "mushy" at a temperature above the melting point of eutectic alloys which may form. Control of the time of quenching is preferably established during submerged welding by a cup-shaped exclusion fitting which is sized relative to the dimensions of a molten weld pool and the speed of travel of a welding heat source such as a plasma transfer arc torch. The cup-shaped exclusion fitting provides improved protection of the weld and heat source with inert gas supplied thereto while also permitting submerged welding at higher hydrostatic pressures than has heretofore been possible. An improved apparatus for transport of powdered welding materials provides for bleeding off of a portion of a flow of transport gas used to transport the powdered materials and can thus provide a reliable supply of such materials over increased distances and against increased gas pressures without compromising the welding heat source or the quality of the weld.

7 Claims, 7 Drawing Sheets fig. 1 fig. 2 fig. 3 fig. 4

UNDERWATER WELDING

FIELD OF THE INVENTION

The present invention generally relates to methods and devices for joining of bodies of metal by welding and, more particularly, to the reduction of residual tensile stresses in the weld.

DESCRIPTION OF THE PRIOR ART

The manufacture and repair of many types of devices and structures requires the joining of metal parts. Soldering, brazing and welding are familiar generic types of techniques of attaching metal parts to each other. Of these, welding is unique in raising localized regions of the parts which are adjacent or abutting to temperatures above the melting point of the constituent metals, with or without the addition of further metal, allowing the metals to flow together so as to form a unitary body.

However, the heating and melting of localized regions causes expansion of the regions which may cause compressive stresses that are relieved in the molten region. Upon cooling, contraction of the solidifying metal, if constrained, such as by unmelted abutting metal adjacent to the weld or other parts of the weld which cool more rapidly, will result in persistent tensile stresses in the weld. Such stresses may be very substantial and result in dimensional distortion of the resulting body of metal or even cracking of the weld, particularly when additional structural stresses are applied when the part is placed in service.

One major type of cracking of the weld after the weld is complete and cooled is known as stress corrosion cracking (SCC). This occurs due to persistent tensile stresses that develop in the weld. The metal in the weld becomes more susceptible to corrosion. The metal is sensitized by the tensile force which weakens the weld over time until the stresses are relieved by cracking. Stress corrosion cracking can be eliminated if tensile stress is otherwise relieved (e.g. by annealing) or if compressive stresses can be developed. However, the annealing of a part is not always possible or feasible where the weld is made to repair a structure of a size or shape such that application of sufficient heat in the vicinity of the weld to achieve annealing is impractical or impossible.

Cracking of the weld is also often observed during the welding process itself. There are two basic mechanisms to such cracking: one, referred to as hot cracking, is associated with weld solidification and cooling and the other, referred to as reheat cracking, is associated with reheating for stress relief to restore the strength of the weld. Reheat cracking can be somewhat diminished if persistent tensile stresses can be limited or compressive stresses developed.

As to hot cracking, the strength of any weld involving an alloy can be compromised by the metallurgical processes which may occur within the weld as the weldment cools. Specifically, when different metals are contained in an alloy which is welded, the solubility of solute materials changes radically with changes in temperature. That is, as a weld solidifies, solute materials are partitioned into either solid or liquid. Such partitioning and solidification of cells or dendrites having different alloy compositions causes the temperature range over which solidification occurs to become extended.

As the dendrites or cells grow with diminishing temperature, solute metals are rejected into the remaining liquid and, eventually, the only remaining liquid exists at interstices between dendrites or cells or combinations thereof. As is well-understood in the art, this liquid will also have the lowest melting point predicted for phase equilibria. For some alloys, this melting point will be the lowest of the possible eutectic temperatures. Superalloys containing nickel, in particular, are known to form eutectic alloys with particularly low melting points; implying a wide temperature range over which solidification occurs. This, in turn, implies that the weld will remain in a "mushy", part solid, part liquid, state for a substantial period of time; allowing the partitioning and dendrite formation described above.

Thermal stresses developed during solidification are transmitted to the liquid (or soft phase) which cannot support them, causing the dendrites or cells to slide against each other. This sliding action also causes cracks to form unless the cracks can be filled with remaining liquid from the weld pool, which is generally not possible, particularly when the weldment cools generally evenly as heat transfer is dominated by heat transmission through the metal surrounding the weld, as is usually the case. Hot cracking is thus aggravated when the temperature range over which the cooling solid phase is soft or "mushy" is relatively large, as in nickel-containing superalloys. Additionally, the tensile stress which develops during solidification can also cause cracking of low ductility solid regions (e.g. dendrites or cells having an alloy composition which is of low ductility) which may form.

The same effects described above also occur during variations of welding processes known as surfacing or cladding in which the surface is coated with a layer metallurgically bonded to the substrate with a different alloy such as a hard surfacing material for surfaces subject to wear, such as for renewing the cutting surfaces of blades or the development of surfaces resistant to chemical attack such as by cladding with stainless steel or a noble metal. This latter purpose would be particularly advantageous in avoiding stress corrosion cracking if the cladding can be reliably performed without "hot cracking" mechanisms being developed, as described above (since the use of a corrosion resistant material necessarily implies some alloying). Additionally, such further welding passes can be made simply for the purpose of annealing the original weld with the heat provided to the original weld from the welding pass at adjacent or overlying locations.

Particularly when welding is done for the purpose of repair or renewal of structures or large systems, welding must often be accomplished under adverse conditions and accommodate extremely complex geometries, such as pipe joints with close clearances. The manner of delivery of additional weld material to the weld can also be adversely affected by the conditions under which the welding operation must be performed. For simple geometries and normal conditions, weld material is often provided by a consumable flux-coated electrode. On the other hand, for continuous welding, particularly by special welding processes or torches, such as plasma torches or tungsten-inert gas (TIG) welding, weld material is often delivered to the torch as a powder transported through flexible tubing over distances of one hundred feet or more. Some conditions under which welding must be accomplished may compromise such a material delivery system.

For example, it is often necessary to perform welding under water or other fluid for repair of hulls of waterborne vessels or in heat transfer systems using a liquid as a medium of heat exchange. While underwater welding is known, generally using a pressurized gas flow to exclude the liquid from the immediate vicinity of the location where the welding process is being performed (i.e. an "exclusion region") and which is necessary to protect an arc or a flame of the welding torch providing the welding heat, cannot be maintained by a gas against hydrostatic pressures which occur at depths greater than about eighty feet of water.

SUMMARY OF THE INVENTION

It is therefore an object of the present invention to provide a technique for welding nickel-containing alloys or alloys which form low melting point eutectics which develops compressive stresses in a substantial volume of the weld.

Another object of the invention is to provide an apparatus and method for making welds of nickel-containing alloys or alloys which form very low melting point eutectics which are not subject to hot cracking and which can be performed under water or other fluid at hydrostatic pressures equivalent to over eighty feet of water without distortion of the weld bead and with reliable and uniform delivery of welding material to the weld in a powdered form.

A method of suppressing cracking in weldments containing at least two materials is provided comprising the steps of forming a weld pool of molten material, cooling the weldment to a temperature below the melting point of the highest melting point alloy which can form from the materials, and quenching the weldment from a temperature above a melting point of any eutectic alloy which can form from the materials.

In accordance with another aspect of the invention, a method of welding in the presence of a fluid at elevated pressure is provided comprising the steps of forming an exclusion region within a cup-shaped enclosure having a compliant skirt, and applying heat to a surface surrounded by the exclusion region.

In accordance with a further aspect of the invention, a method and apparatus for welding is provided comprising the steps of or arrangements for transporting powdered welding material though a hose to a hopper with a flow of transport gas, venting a portion of the transport gas from the hopper, and transporting the powdered material from the hopper through a further hose by gravity or a remainder of the transport gas.

In accordance with yet another aspect of the invention, an apparatus for forming a weld in the presence of an ambient liquid is provided comprising a cup-shaped enclosure having a compliant skirt and an arrangement for supplying a gas to an interior of the cup-shaped enclosure at a pressure at least equal to ambient hydrostatic pressure of said ambient liquid.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
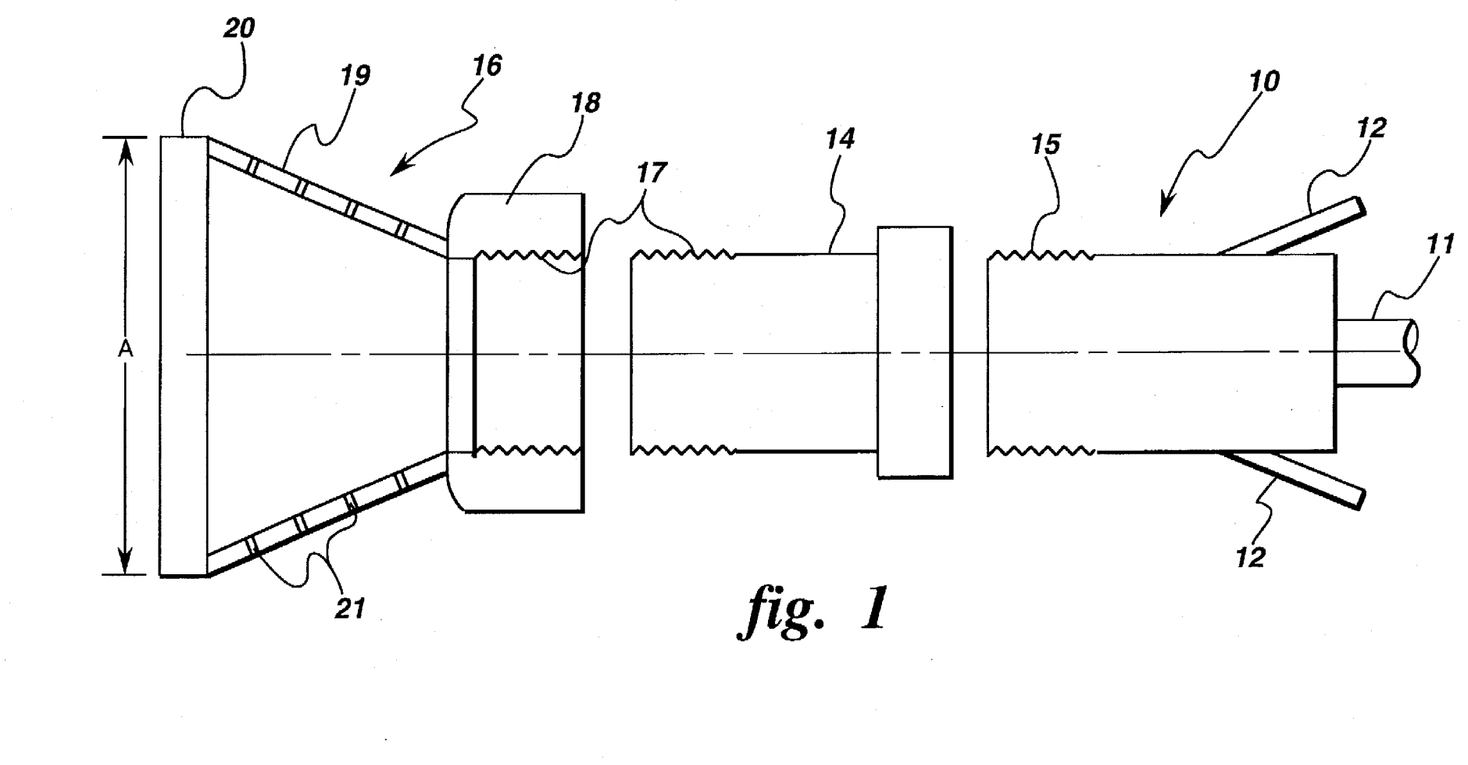
FIG. 1 is an exploded cross-sectional view of a torch and liquid exclusion fitting providing a liquid exclusion zone.

Referring now to the drawings, and more particularly to FIG. 1, there is shown an exploded view of a plasma transfer arc (PTA) or other torch 10, a gas lens 14 (both in highly schematic form) and cross-sectional view of a cup-shaped fluid exclusion fitting 16 in accordance with a feature of the invention. PTA torches and gas lenses for use therewith are well-known in the art and the details thereof are not necessary to an understanding of the principles of the invention and their practice by those skilled in the art. Further, the schematic depiction thereof is intended to be generic to other types of welding torch with which various features of the invention may be used to advantage in various applications, circumstances and environments.

In general, however, a plasma torch usually includes a central electrode of a high-temperature resistant material such as tungsten surrounded by a second electrode, of generally annular form. The remainder of the torch is arranged to direct a high-pressure flow of inert gas at substantial volume through the gap between the central electrode and the annular electrode which will be ionized to form a plasma when an arc is struck between them. A gas flow around the outer periphery of the annular electrode also provides for protection of the work piece. The plasma flow to the work piece is enhanced by the use of a gas lens which acts to shape or "focus" the gas flow, whether or not gas flow is provided around the outer, annular electrode. The inert gas flow also causes the plasma to extend outwardly from between the electrodes to transfer heat to a surface such as metal parts to be welded.

A plasma transferred arc torch operates in much the same manner but utilizes the surface to be heated as an electrode instead of the annular electrode of the plasma torch. That is, the arc is struck between the central heat-resistant (e.g. tungsten electrode) and the surface at which welding is to be done and, hence, plasma is "transferred" to the surface. The inert gas flow serves the same function of supplying ionizable gas to the arc for formation of the plasma and to protect the arc as well as the molten material of the weld and the tungsten electrode. In underwater welding, the inert gas also assists in formation of the exclusion region although additional gas flow and higher pressure may be required.

In the presently preferred implementation of the invention, PTA torch 10 includes electrodes to which a voltage and current appropriate to the maintenance of a welding arc and a gas inlet 11 to receive a flow of gas which is intended to serve to regulate the shape of the plasma developed by the arc. This gas is generally divided into a so-called plasma center gas flow around the central electrode for supplying gas to the plasma and a so-called shielding gas flow which is intended to displace ambient gases (or liquids, at ambient hydrostatic pressures) and to contain the perimeter of the plasma. These gas flows are modified and directed in the immediate vicinity of the arc plasma by a gas lens of a commercially available type, the details of which are generally unimportant to the practice of the invention. The gas lens is provided with threads (not shown) which mate with threads 15 on the PTA torch for facility of replacement and interchange. Welding materials in the form of a powder may be introduced into the torch at inlets 12 and which form part of the system in accordance with the invention which will be discussed in greater detail below.

The exclusion fitting 16, in accordance with the invention, is similarly fitted to the gas lens (or torch) with mating threads 17 formed on a mounting collar portion 18, also provided for convenience of replacement or interchange. The body 19 of the exclusion fitting 16 is generally conical (as shown) or cylindrical as may be dictated by providing an end dimension A of about one to three inches. This dimension A is preferably determined to provide an exclusion region slightly larger than twice the length of the weld pool (i.e. A/2 is slightly longer than the extent of the weld pool in a radial direction (regardless of the shape of the "footprint" of the exclusion fitting at skirt 20) from the central location of the plasma) which depends on the amount of heat applied to the weld, the thickness, thermal conductivity and melting point of the material to be welded and the intended rate of torch travel along the weld. In other words, the solidification of the weld should begin just slightly inside the exclusion region such that exposure to ambient liquid or water preferably (although no particular limits have been observed) occurs within about one-tenth second to two seconds after onset of solidification of the weld pool relative to the speed of torch travel in accordance with a feature of the invention, described below, by which persistent compressive forces are developed within the weld. Thus the dimension A is not particularly critical to the practice of the invention even for the development of compressive force within the weld.

As a matter of achievement of exclusion of ambient liquids, the dimension A is not critical but, as a practical matter, should not be so large as to encompass severe topology to which the skirt 20 cannot conform or to provide a perimeter of such length as to present increased gas escape area such as would then require increased volumes of gas to maintain liquid exclusion. The minimum size should provide for avoidance of damage by the heat of the welding process and too rapid quenching of the weld (e.g. allowing the liquid to contact the molten weld pool).

The purpose of the body 19 of the exclusion fitting 16 is simply to impose a favorable geometry on the exclusion region which cannot otherwise be maintained against high hydrostatic pressures. At high hydrostatic pressures, the collapse of gas bubbles in the vicinity of the arc allows the extremely rapid ingress of fluid toward the arc cannot be reliably maintained. At the same time, it is desirable that turbulent or high velocity gas flows in the vicinity of the arc and the workpiece be avoided.

Therefore, it is preferred that a skirt 20 of woven metal be provided at the distal end of the exclusion fitting, preferably by spot welding, to provide compliance to the workpiece surface and weld bead or cladding overlay as the weld is made and to provide for escape of gases through the body 19 of the exclusion fitting 16 by means of relatively small (e.g. 100 microns in diameter) apertures or pores 21 evenly distributed over body 19. The diameter of the apertures is not critical so long as the escape of gas against the hydrostatic pressure is constricted sufficiently to maintain gas pressure within the exclusion fitting and that gas bubbles substantially fill the apertures. Alternatively, body 19 may be fabricated of closely fitting fiber-shaped elements such as wires in the manner of a frustro-conical or cylindrical brush (thus providing tortuous apertures of high aspect ratio which are also evenly distributed over body 19) which may provide further compliance with the workpiece and weld. The escape of gases though the apertures or spaces between wires or fibers thus provided displaces liquids which would otherwise be forced inward by high hydrostatic pressure. The confinement of the gas by exclusion fitting 16 also allows the exclusion zone to be reliably maintained with reduced gas flow volume by maintaining a pressure in excess of the ambient hydrostatic pressure to water depths well in excess of eighty feet by constriction of the paths by which gas is allowed to escape from the exclusion fitting.

It has been found that small apertures 21 in body 19 of exclusion fittings 16 would eventually clog with powdered weld material but that the exclusion fitting continued to function to provide exclusion at high hydrostatic pressures and without significant disturbance of the shape of the heat source. Such clogging was much less pronounced with the brush-like structure described above. In any event, the apertures 21 are not, in fact, necessary to the practice of the invention and a solid body exclusion fitting can be used to good effect in the practice of the invention. Therefore, the apertures 21 should be considered as a perfecting feature of the invention.

It should also be understood that while the exclusion region can be maintained by a combination of the plasma center gas and the shielding gas, possibly supplemented to some degree by the powder carrier or transport gas, a separate gas supply can be provided for the exclusion fitting itself. Therefore, the use of an exclusion fitting as described above need not impose any particular limitations of the gas supplies provided for operation of the welding torch in the preferred manner. By the same token, while use with a PTA torch is presently preferred, use of an exclusion fitting in accordance with the invention can be used with any heat source including oxy-acetylene and carbon arc torches and tungsten inert gas torches, as well as plasma torches described above. Of course, it should be recognized that the basic invention, as described above, does not rely at all on the use of powdered weld material alluded to above and a preferred delivery system for which, in accordance with the invention, will be described below but, rather, the invention may be practiced using conventional welding rods (e.g. so-called "stick welding"), by continuous feed of welding rod in wire form or the like or even forming the weld pool from material contained in the substrates or bodies to be welded together.)

Increased gas pressure, however, would compromise the delivery of powdered weld material (e.g. metal and flux) to the torch and the weld by conventional arrangements. As alluded to above, efforts to improve material delivery by increasing transport gas flow to overcome increased gas pressure (which must slightly exceed the hydrostatic pressure) and frictional forces associated with powder feed line lengths have been found to distort the shape of the weld produced, evidently by distortion of the arc or heat source. The known technique of providing powder ports integral with the torch nozzle on opposite sides of the plasma orifice at the center of the nozzle causes the increased gas flow to impinge on the plasma (or flame) and distort its shape; resulting in the double bead described above and in severe cases developing two separated weld beads on either side of the intended weld location.

In accordance with the invention, an improved weld material delivery system is provided as will now be described with reference to FIGS. 2 and 3.

Figure 2:
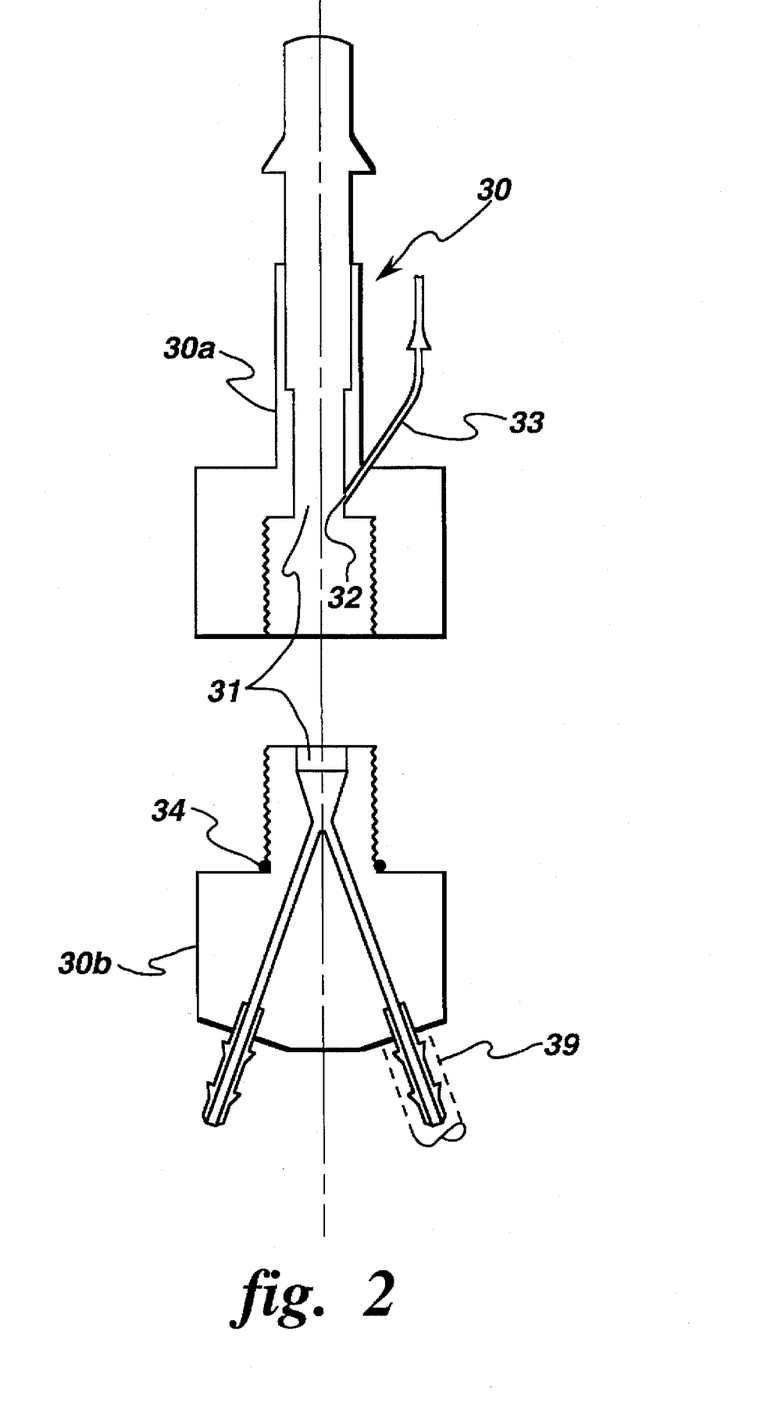
FIG. 2 is an exploded cross-sectional view of a form of liquid exclusion fitting for use with powdered weld material.

Referring to FIG. 2, the invention provides a modified Y-fitting 30 as a small capacity gravity feed powder hopper.

The Y-fitting is similar to fittings such as would normally be mounted at the bottom of a gravity fed powder hopper which would be located about three feet or less above the torch during welding. However, in accordance with the invention, the known Y-fitting is modified by enlarging the inner cavity 31 and providing a hole 32 in the supply side of the fitting to which a tube 33 is preferably attached by brazing. Both of these modifications are preferably facilitated by formation of the Y-fitting in two portions 30a, 30b preferably threaded to each other and sealed with an O-ring seal 34, as shown. This modified Y-fitting is preferably mounted very closely above the torch and powder fed to the torch through hoses 39 attached to barbed fittings mounted on the lower end of the Y-fitting, preferably by brazing. Two such hoses are preferred as a matter of convenience in adapting this feature of the invention to existing torches which utilize the prior gas transport technique described above but more or fewer such outlets could be provided, as desired or may be found convenient by those skilled in the art.

By the use of this modified Y-fitting 30, a controlled amount of the powder transport gas flow can be bled off through hole 32 and tube 33, allowing a much higher gas flow rate to be used for powder transport than the gas flow rate, if any, allowed to enter the torch. The gravity feed from the small hopper thus provided may be sufficient to feed powder to the torch if the pressure within the hopper balances the pressure within the torch or exclusion region (e.g. defined by the exclusion fitting 16) so that reverse gas flow from the torch to the Y-fitting does not occur. However, it is considered preferable for regulation of material flow for a relatively small volume of gas to be forced from the Y-fitting to the torch to facilitate powder delivery thereto. In any case, the volume and velocity of gas forced into the nozzle may be readily reduced to levels which do not significantly distort the heat source and allow a single bead weld to be formed. It should also be understood that the principle of bleeding off of additional gas flow used to facilitate powder transport can be applied to a hopper of any size. However, a small size hopper mounted near or on the torch is preferred since it has the advantages of accommodating close clearances to structure near the weld location, greater potential reduction of gas flow to the torch consistent with good powder feed and capability of being constructed to withstand high internal and external pressures without requiring large amounts of material or special structures. The small size is particularly convenient since existing hardware can be modified as described above to provide the function of improved powder feed without significant distortion of the heat source.

Figure 3:
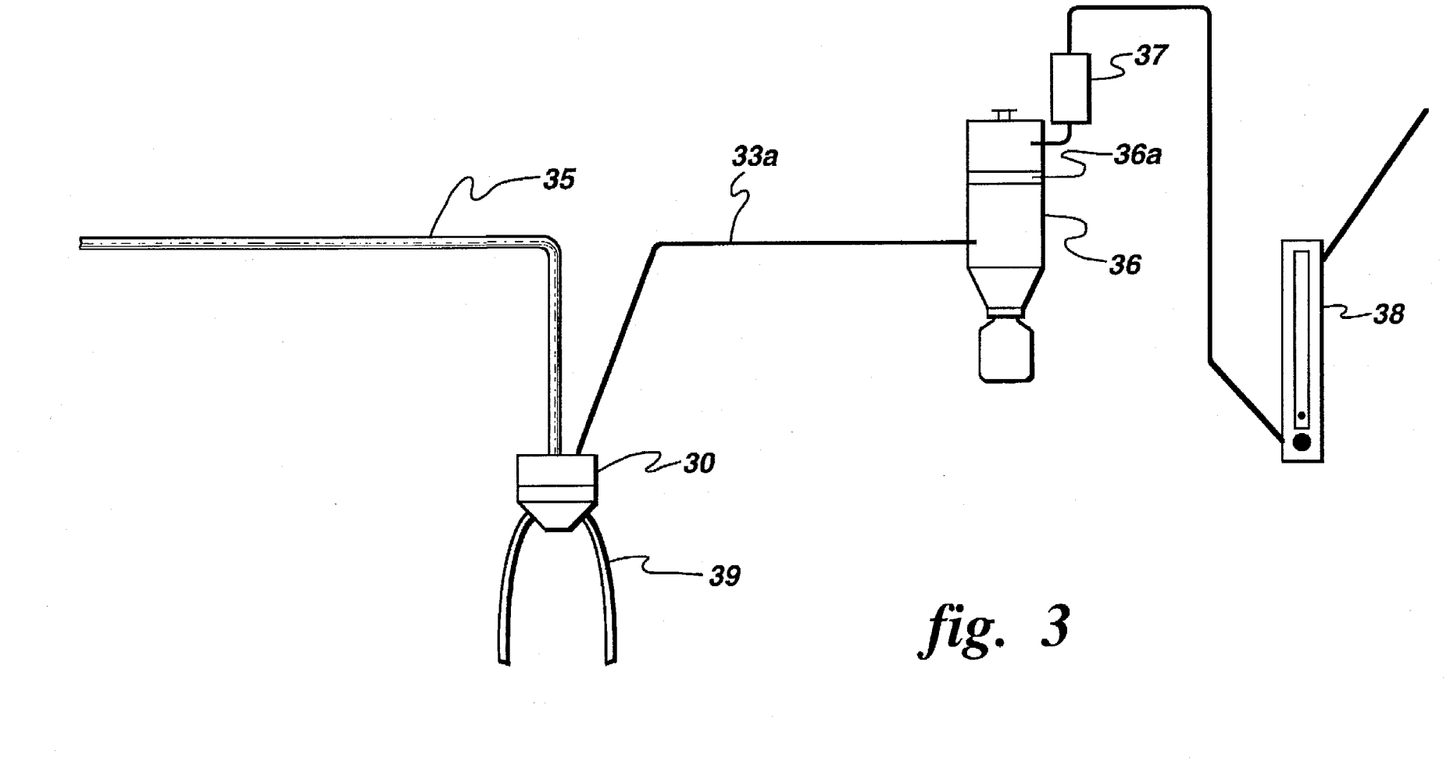
FIG. 3 is an overall view of a powder material delivery system.

The overall powder transport system is shown in FIG. 3. Powder weld material is transported to Y-fitting distribution block 30 entrained in a preferably inert gas at high pressure and flow rate through hose 35. The bled off transport gas, which will contain some amount of powder is carried by pressure relief line 33a to a gravity powder separator or collector 36. Separation of residual powder from the gas may be enhanced by inclusion of a baffle 36a. For safety, an over pressure relief valve may also be provided and will achieve the additional function of preventing excessive gas pressure build-up in Y-fitting 30 which would increase gas flow to the torch. Separated gas is allowed to flow from the upper portion of powder separator and collector 36 through a water vapor filter 37 and a flow meter 38 so that the difference in the amount of transport gas above the amount of gas permitted to escape can be regulated. Of course, this difference between transport and exhaust gas flow is delivered to the torch to assist in powder delivery and maintenance of the exclusion region.

In view of the foregoing, it is seen that an exclusion region can be maintained against greater hydrostatic pressures than have heretofore been possible and that powder weld material can be delivered to a torch operating at such hydrostatic pressures without distortion of the heat source, resulting in high quality welds. Additionally, it has been found that submerged welding facilitated by these structures in accordance with the invention is capable of producing persistent compressive forces in welds with consequent reduction in hot cracking, reheat cracking, helium embrittlement and stress corrosion cracking. This unexpected benefit, discovered during experimental use of these devices in accordance with the invention can also be produced over the full range of hydrostatic pressures at which welding can be accomplished by use of these devices.

Specifically, it has been found that rapid quenching of a weld involving alloys and nickel-containing alloys, in particular, at or shortly following the onset of solidification of weld materials when the weld is soft produces reduced distortion of welded parts and persistent compressive stresses at the surface of the weld and for a substantial depth within the weld sufficient to effectively suppress the mechanisms of hot cracking, reheat cracking, helium cracking and stress corrosion cracking discussed above. The mechanism of the production of persistent compressive force is not considered to be understood since the existence of persistent compressive forces implies the existence of persistent tensile forces within another part of the weldment and such persistent tensile forces have not yet been discovered or localized within the weldment. It is possible that the tensile forces are distributed in regions of the weld which are less subject to cracking and, by virtue of the distribution, are reduced to such low levels of stress that they are insufficient to nucleate cracking and undetectable by conventional means, as well.

It should be recognized that this effect of producing persistent compressive forces has not been observed with ferritic or martenitic materials welded underwater which may be due, in part to the fact that such materials solidify in a face-centered cubic (FCC) crystalline structure and, as cooling nears completion transform to a slightly more compact body-centered cubic (BCC) crystalline structure whereas austenitic materials, such as superalloys containing nickel and other alloys do not undergo this latter transformation.

Further, the production of persistent compressive forces is counter-intuitive since it is most pronounced at large heat inputs generally considered as exceeding 1.0 Kilojoules per inch of weld which cause substantial expansion of the welded materials. Such expansion in advance of the weld tends to push the parts being welded away from each other at the point of the weld. Contraction of the materials behind the weld after solidification also tends to separate the parts as the weld solidifies to cause tensile stresses and nucleate cracking. Further, the production of persistent compressive stresses is apparently independent of the depth of the weldment.

While not wishing to be held to any particular theory of the development of persistent compressive forces or the suppression of various cracking phenomena it appears that the effects may, in part, be due to the change of boundary conditions at the edge of the exclusion region. That is, when the weld is quenched, the heat removal mechanisms are not dominated by conduction through the welded material but have a substantial component of heat transfer to the ambient liquid. Surface heat transfer effects would diminish with depth within the weld possibly driving any tensile stresses deep within the weld and distributing them to reduce their magnitude beyond detectability as noted above and allowing compressive forces to be developed at the weld surface and for a substantial depth within the weld. Since persistent compressive forces are, in fact, developed, the surface is not prone to consequent stress corrosion cracking. Reheat cracking may be suppressed since reheating would merely reduce compressive forces as well as corresponding tensile forces. Because compressive forces are developed, stresses which are due to non-uniform reheating cannot generally reach tensile levels where cracking can occur except for the least ductile of alloys.

Figure 4:
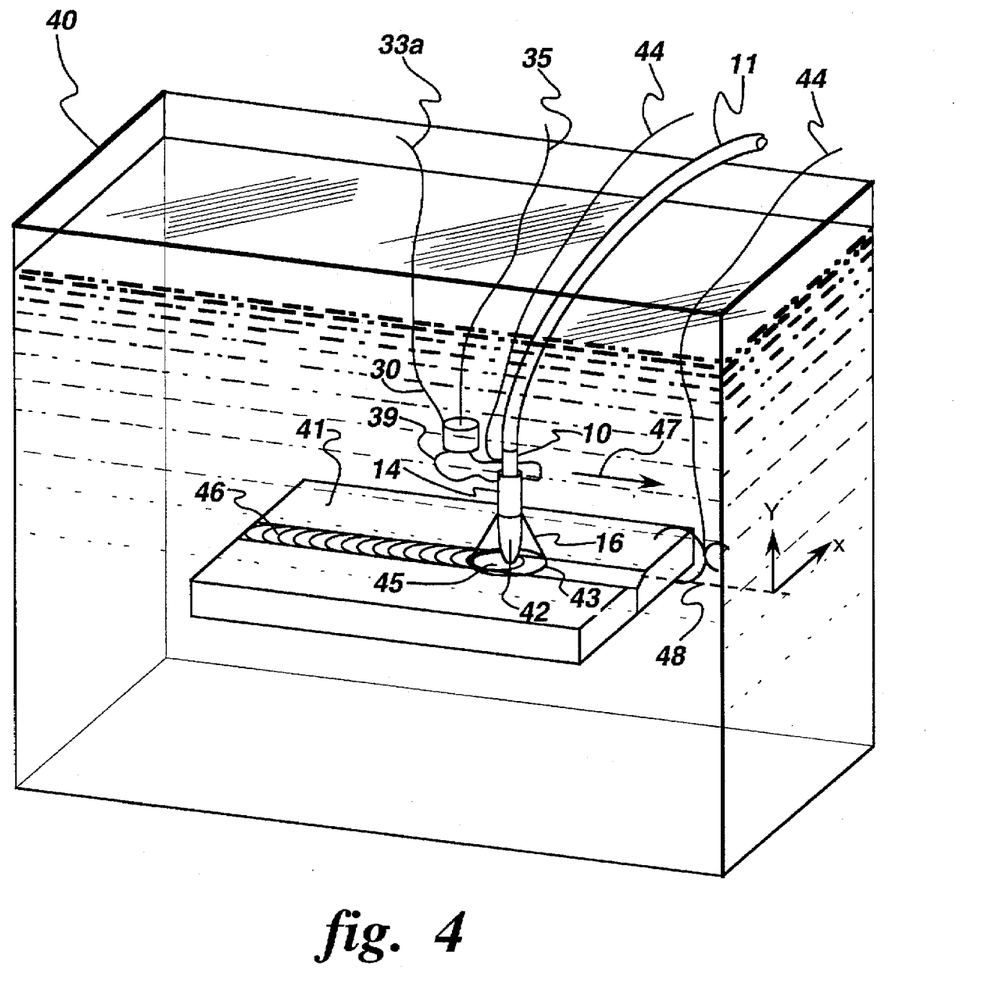
FIG. 4 illustrates an exemplary use of the invention and conditions sufficient to the production of persistent compressive forces in a weldment.

FIG. 4 illustrates the making of a weld under conditions sufficient to the production of persistent compressive forces and the inhibition of hot cracking, reheat cracking, helium cracking and stress corrosion cracking. The submerged welding is schematically depicted by a fluid-containing tank 40 similar to that used in experimental trials of the invention but is otherwise unnecessary to the practice of the invention. The torch 10 with inert gas supply line 11, gas lens 14, and exclusion fitting 16 are shown assembled and located adjacent the surface 41 at which the weld is to be made and such that the plasma 42 extends to that surface. It should be understood that exclusion fitting 16 is not necessary except at substantial depths causing large hydrostatic pressure and that an exclusion region of approximately the same "footprint" 43 could be established by gas flow alone. On the other hand, the tank used in experimental trials of the invention could be pressurized to simulate depths of in excess of eighty feet where the exclusion fitting 16 would be necessary. Weld material is supplied through hose 35 to Y-fitting distribution block 30 and bled off transport gas exhausted through hose 33a after pressure and flow regulation and powder separation as discussed above. Powdered weld material is transported to torch 10 through hoses 39, also as discussed above. A plasma transferred arc torch being assumed, electrical power is supplied to the torch 10 and workpiece 41 through electrical connections 44.

To make a weld, inert gas (e.g. argon) is supplied through hose 11 to develop an exclusion region (e.g. within exclusion fitting 16), an arc is struck in torch 10 which supplies heat to surface 41 and develops a pool of molten metal 45 to which powdered weld material and flux is added through hoses 39. The torch is then moved in the direction indicated by arrow 47 with the weld pool 45 trailing behind the plasma 42. Dimension A of the exclusion region is chosen such that A/2 will approximate or slightly exceed the length of the weld pool 45 so that the weld will be quenched very shortly after the onset of solidification, as shown, and persistent compressive forces will be developed in weld 46. These forces are plotted in FIGS. 5 and 6 as a function of distance from the centerline 48 of the weld in the X and Y directions indicated in FIG. 4.

Figure 5:
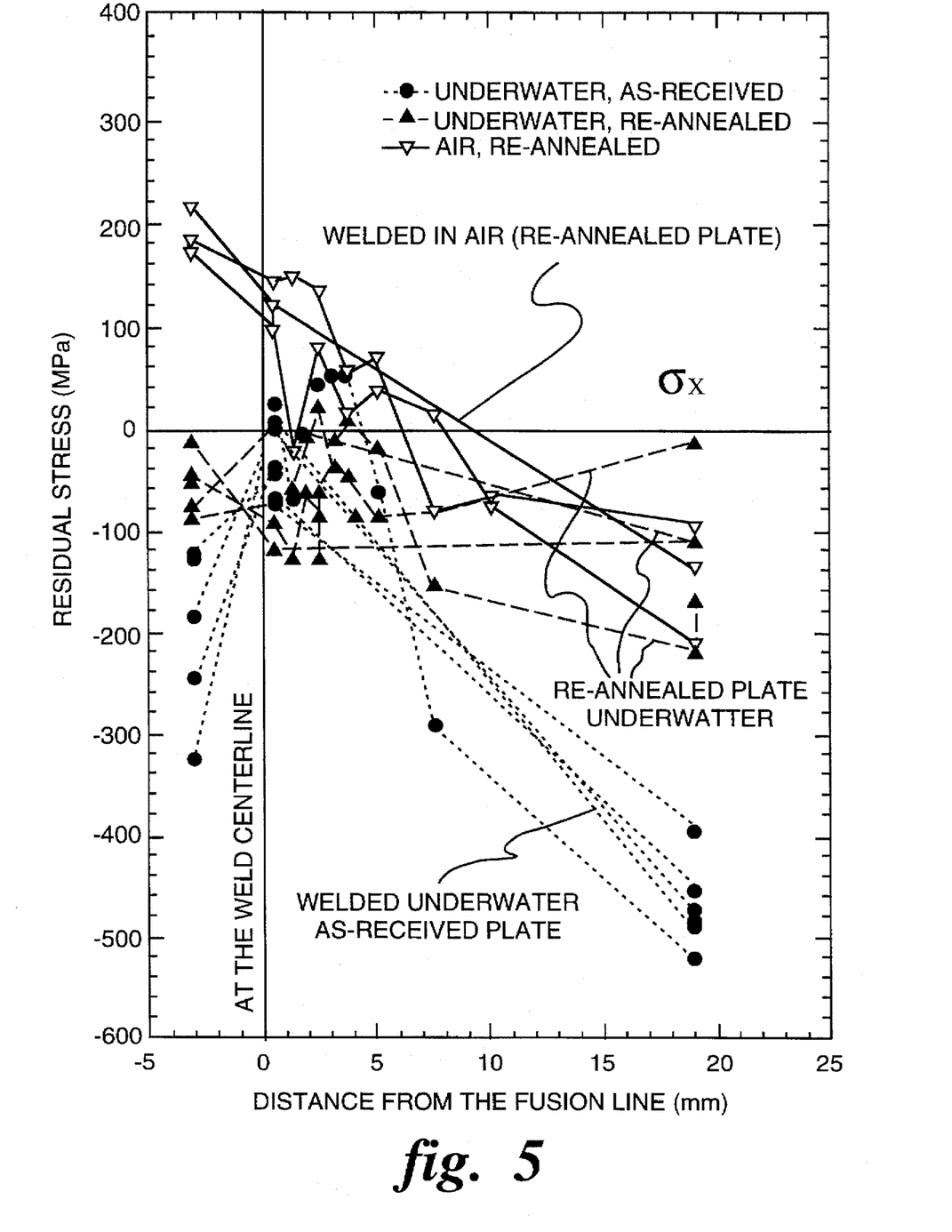
FIG. 5 is a graph of residual stresses developed in a weld and surrounding material at differing distances from the centerline of the weld in a direction parallel to the surface of a welded plate.
Figure 6:
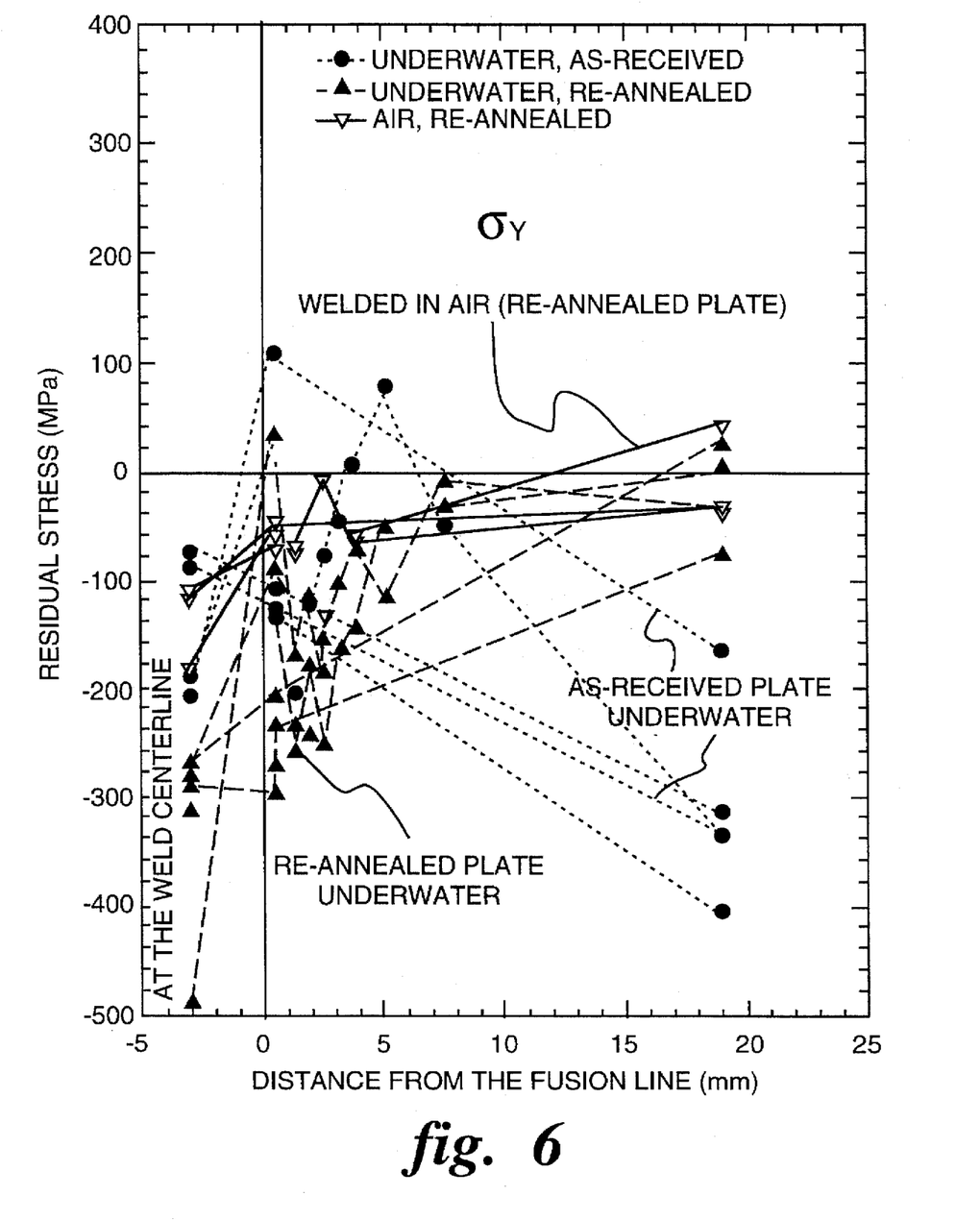
FIG. 6 is a graph of residual stresses developed in a weld and surrounding material at differing distances from the centerline of the weld in a direction perpendicular to the surface of a welded plate.

In FIGS. 5 and 6, the stress in a plate welded in accordance with the invention and as thereafter annealed is compared to a plate conventionally welded in air and re-annealed. Tensile stresses are plotted as positive and compressive stresses are plotted as negative. The measurements depicted were made by standard x-ray scattering techniques. It can be seen from FIG. 5 that conventional welding, causes substantial tensile forces to develop in a direction perpendicular to the weld direction which extend for a substantial distance across the plate surface (and thus sensitized to SCC) and which are maximized near the centerline of the weld. For the same air-welded on re-annealed plate, only slight compressive forces will be developed at a shallow depth below the weld surface while substantial tensile forces are developed deep within the weld (FIG. 6). In contrast, the weld produced in accordance with the invention shows only scattered tensile forces perpendicular to the weld direction (FIG. 5) with predominantly compressive stresses at the weld centerline and very significant compressive stresses from 5 mm to 20 mm distant from the weld centerline. As shown in FIG. 6, very significant compressive stresses are developed at the weld surface (e.g. −3 mm where the weld bead surface extends 3 mm into the weld) and continues at substantial levels to at least 19 mm within the plate; relatively slight tensile forces being occasionally observed in some samples at or slightly below the weld centerline and well within the weld.

Figure 7:
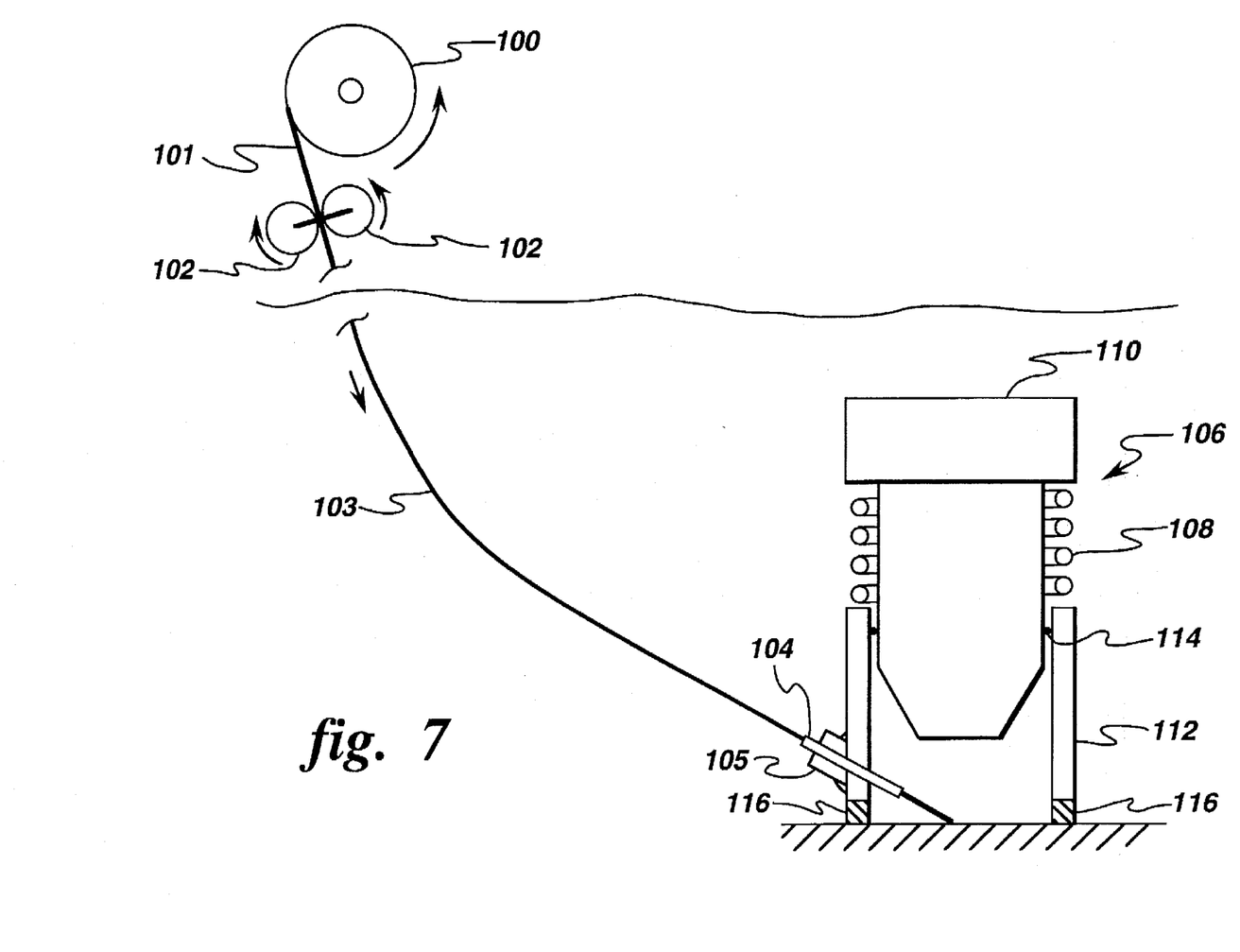
FIG. 7 is a schematic drawing of a wire-fed underwater plasma transfer arc system.

FIG. 7 shows a wire fed apparatus which comprises wire spool 100, drive rolls 102, guide tube 104 and torch assembly 106. The torch assembly comprises a spring 108 supported PTA torch unit 110, exclusion device 112, gas cup 113, o-ring seal 114, and surface contact portion 116 which is made of a suitable compliant material.

In operation wire 101 is taken from the wire spool 100 and driven through flexible guide tube 103 to metal guide tube 104 which is held in place by a compression fitting 105 into the weld area under the torch.

The apparatus and methodology of the invention provide for high-quality weldments which suppress cracking by development of persistent compressive forces in the weld. The methodology is extended by the apparatus to hydrostatic pressures at which welding could not heretofore be accomplished and, at the same or lesser hydrostatic pressures, accomplish the welds without malformation of the weld.

What we claim is:

1. An underwater welding method for suppressing cracking in welds comprising the steps of forming an exclusion region in a volume of ambient liquid by gas pressure within an exclusion fitting having a surface compliant skirt, forming a weld of molten metal within said exclusion region quenching said weld to the temperature of the ambient liquid.

2. A method as recited in claim 1, wherein the weld is quenched by moving said exclusion region to expose the weld to the ambient liquid.

3. A method as recited in claim 1, wherein said exclusion region is formed by gas pressure within the exclusion fitting by supplying a flow of gas directly to said exclusion fitting.

4. A method as recited in claim 3, wherein said flow of gas is supplied to said exclusion fitting from a welding torch of the plasma transfer arc type.

5. A method as recited in claim 3, including the further steps of transporting powdered welding material through a hose to a hopper by flow of a transport gas, venting a portion of said transport gas from said hopper, and transporting said powdered material from the hopper to the welding torch by gravity or flow of the transport gas.

6. A method of welding in the presence of an ambient liquid at elevated hydrostatic pressure, comprising the steps of forming an exclusion region within a cup-shaped exclusion fitting having a surface compliant skirt, and applying heat by a plasma welding torch to a metal surface within said exclusion fitting to form a weld, moving said cup-shaped enclosure along said surface to quench the weld.

7. A method as recited in claim 6, including the further steps of transporting powdered welding material through a hose to a hopper with a flow of transport gas, venting a portion of said transport gas from said hopper, and transporting said powdered material from said hopper to a plasma welding torch by gravity or flow of transport gas.

* * * * *